J. HÄRDÉN.
ELECTRIC FURNACE.
APPLICATION FILED DEC. 7, 1909.
967,909.
Patented Aug. 23, 1910.
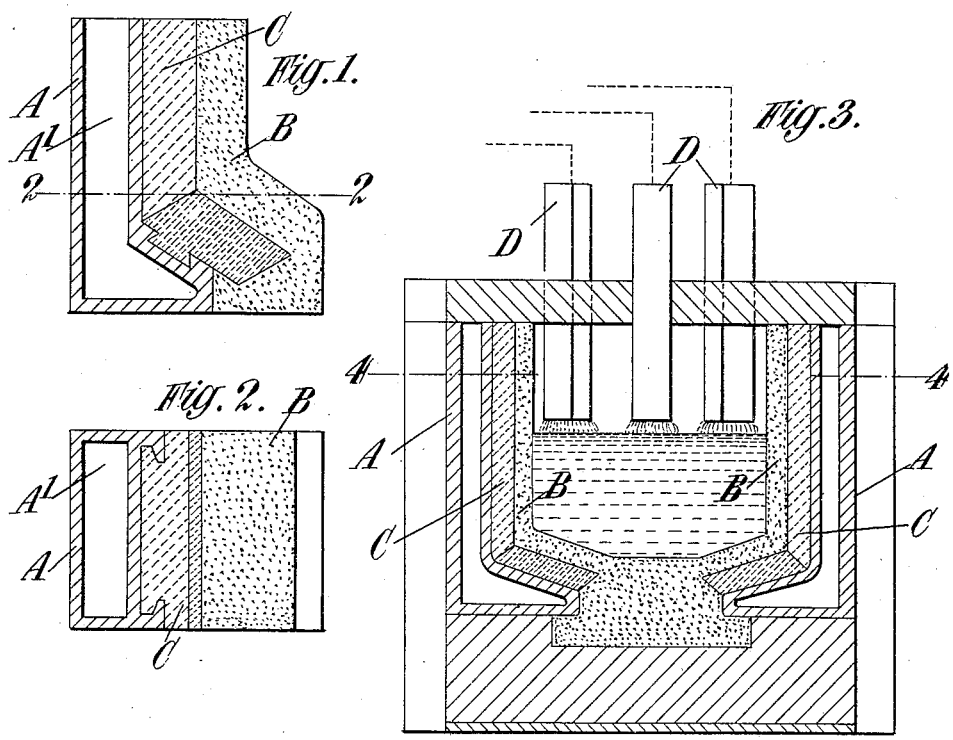
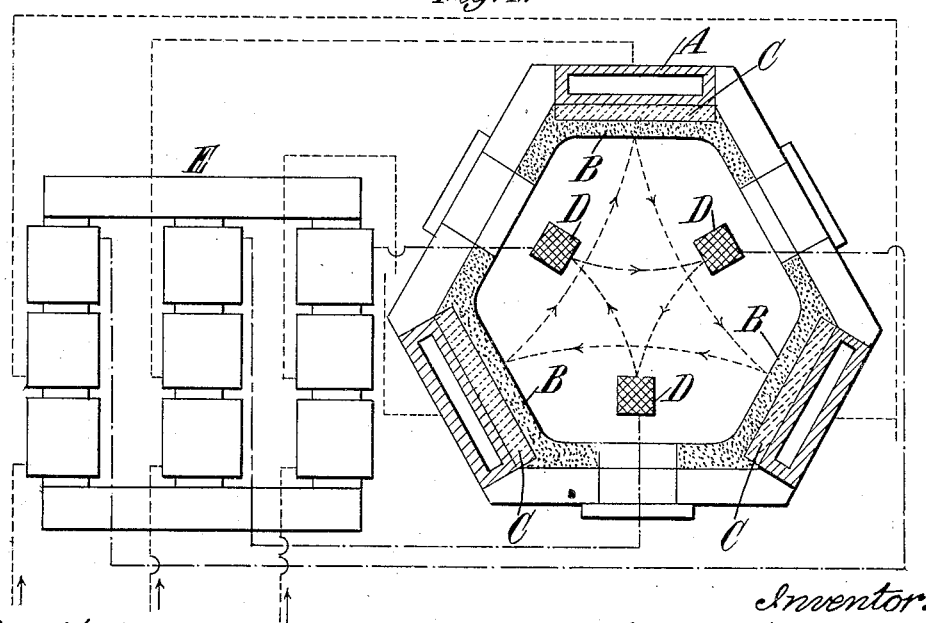

UNITED STATES PATENT OFFICE.

JOHANNES HARDEN, OF LONDON, ENGLAND, ASSIGNOR TO THE GRONDAL KJELLIN COMPANY. LIMITED, OF LONDON, ENGLAND.

ELECTRIC FURNACE.

967,909.  Specification of Letters Patent. Patented Aug. 23, 1910.

Application filed December 7, 1909. Serial No. 531,826.

*To all whom it may concern:*

Be it known that I, JOHANNES HÄRDÉN, a subject of the King of Sweden, residing at 20 Abchurch Lane, in the city and county of London, England, have invented certain new and useful Improvements Relating to Electric Furnaces, of which the following is a specification.

This invention relates to electric furnaces and has particular reference to furnaces of the kind in which the heating of the charge is effected partly by means of an electric arc or arcs, and partly by means of high resistance terminal plates in the walls of the furnace.

It is a well known fact that for the efficient treatment of steel in a furnace the slag that floats upon the molten steel should be heated to such an extent as to result in the formation of sulfids of calcium and manganese in the slag, in order to extract the injurious sulfur from the steel; also it is necessary to maintain the slag at such a temperature as to prevent the steel from being again enriched in sulfur or other impurities by absorbing the latter from the refining slag. The production of these sulfids is spoken of in metallurgy as the formation of carbid slags, because the formation takes place at a temperature at which calcium carbid is formed in the slag, if calcium compounds and carbon are at the same time present in the furnace charge. This formation of carbid slags is considered by metallurgists as being the safest indication of the expulsion or withdrawal of the impurities from the steel. Again, it is a well known fact that gaseous substances, such as oxygen, if occluded in the molten metal, are highly injurious to the production of good steel, and should therefore be expelled as far as possible. This cannot however be done on a commercial scale by slags only because the gases will remain occluded in the metal; moreover, the physical conditions governing the solution of gases in liquids are such that the expulsion of the gases from solution cannot be effected merely by the attainment of a high temperature, but requires gradual changes of temperature from a lower temperature to a higher one and vice versa to be made.

Steel manufacturers are at the present time endeavoring to deal with large masses of steel electrically, but if any of the known types of electric furnaces were constructed of, say, thirty to fifty tons capacity, the above stated gradual change of temperature would be very difficult, if not impossible, to attain for the following reasons. In the case of a simple arc furnace, the mass of molten metal is necessarily heated from above only, because the amount of current forming the arc is obviously not of sufficient density to materially heat the charge in passing through the same, by virtue of the low electrical resistance of the charge. Therefore, although the use of an arc furnace has the advantage that the above mentioned carbid slags are formed, when it is desired to expel the gases by gradually altering the temperature, this can only be done by reducing the strength of the current or wholly interrupting the current through the arcs, and afterward again employing the full power in order to obtain the steel in a sufficiently liquid condition for tapping. But since the furnace is an arc furnace the re-heating commences from above the metal where the arcs are formed, and the upper, hotter strata of metal will materially obstruct the expulsion of the gases beneath. Also, the re-heating from above only, of a large charge as for instance thirty or fifty tons, is slow and entails great heat losses by radiation. Again, if the charge is heated from below, as in the case of an ohmic resistance furnace or an induction furnace or a combined ohmic resistance and induction furnace, the expulsion of the gases may be effected as stated, but the formation of carbid slags by the superheating of the slag is very difficult or impossible to effect. Moreover the charging of the furnace with large masses of cold scrap metal is difficult to accomplish efficiently and in any case except in arc furnaces necessitates the leaving of a remainder or "sump" in the furnace for the melting down of the scrap metal. In the case of an arc furnace with one or several arcs, this charging is objectionable owing to the protruding parts of the charge short circuiting the electrodes with the result that a heavy rush of current occurs, which subsides when the protruding metal is fused, thus producing considerable variations in the output of the generating plant. It is therefore very desirable to employ a furnace of such a nature as to permit the bulk of the electric energy to pass directly through the mass of metal to be treated, and to allow a carefully regulated smaller portion to enter the metal by means of electric arcs. A furnace of this kind will possess the following characteristics. It will render possible the production of the so-called carbid slags, owing to the intense heat developed on the surface of the metal by the electric arc or arcs, and, at the same time, it will permit the necessary variations in the temperature to be made to expel the occluded gases, because the arcs may be temporarily extinguished and the temperature controlled by regulating the other source of heat. Also, a strong agitation of the molten metal in a vertical direction is brought about, thus assisting in the preservation of the lining and resulting in a rapid refining of the metal, whereas in ordinary furnaces a horizontal agitation occurs which destroys the lining.

Furnaces in which a portion of the electric energy is conveyed to the charge by means of composite terminal plates formed of metal plates faced with so-called conductors of the second class, while the bulk of the energy is conveyed to the charge by means of electric arcs, have already been proposed. Such furnaces however do not permit the operation to be carried out with large masses of metal in the particular manner above set forth, for the following reason. When the current is passed through the second class conductors above referred to, which are initially heated and then become conductive after the manner of a Nernst lamp, the conductors become very hot and transfer their heat to the metal that is in contact with them. But it is evident that in order to heat the bath effectively in this way, the said conductors must be at least as hot or hotter than the charge itself. But if the said conductors are heated to that extent, the metal plates at the rear of the same (generally made of iron or cast steel) will become heated to such an extent as to melt them, thus destroying them. This is the chief reason why the combined type of furnace above referred to is not able to fulfil the requirements for dealing with large quantities of metal, since to avoid the destruction of the terminal plates the bulk of the electric energy has to be conveyed to the charge by means of the electric arc or arcs, and when depriving the arc or arcs of electric energy, the supply of energy to the whole furnace must be discontinued to prevent the terminal plates from being destroyed by overheating. The destruction of the terminal plates is highly dangerous, because the molten metal may rush out from the furnace on to the floor and fatally injure the attendants.

According to the present invention I provide an electric furnace with one or more composite plates so constructed or arranged that the gradient of temperature between the face exposed to the charge in the furnace and the rear face of the plate is sufficiently steep to keep the material of which the rear face is composed comparatively cool. For this purpose the terminal plate may consist of layers of material of increasing electrical conductivity. A convenient arrangement consists of a metal plate constructed for the circulation of a cooling medium in contact with it, a facing of a highly refractory substance such as magnesite, chromite, or zirconite, and an intermediate layer of carbonaceous material packed between the metal plate and the refractory facing. Terminal plates of this kind are especially useful in furnaces in which an electric arc or electric arcs are also employed, since large quantities of steel, say thirty or fifty tons, are thereby rendered capable of being efficiently treated.

In order that the invention may be clearly understood and readily carried into effect I will describe the same more fully with reference to the accompanying drawings, in which:—

Figure 1 is a vertical section, and Fig. 2 a horizontal section on the line 2—2 of Fig 1, of one form of my improved terminal plate. Fig. 3 is a vertical section, and Fig. 4 a horizontal section on the line 4—4 of Fig. 3 showing the application of my invention to a three-phase furnace.

The terminal plates, one or more of which are embedded in the wall of a direct current or alternating current furnace, each comprise the metal plate A, the refractory facing B, and the intermediate layer of carbonaceous material C. The metal plate A is of cast steel and is formed with one or more cavities or channels A' in which air or other cooling medium is circulated. The intermediate layer C may consist of graphite or other suitable carbonaceous material mixed with a suitable binding material and rammed into position, or it may be prepared after the manner of preparing carbon arc electrodes and be shaped before being placed in position. In Figs. 1, 2 and 3 this layer C is shown as comprising two blocks, one being vertical and the other almost horizontal.

Owing to the interposition of the comparatively good electric conducting carbonaceous layer between the refractory facing and the metal plate, the refractory facing B may be heated to a much higher temperature than it could safely be heated to if it were in immediate contact with the metal plate and the refractory material employed is therefore preferably such as is capable of withstanding an intense heat; chromite, or zirconite, is useful for this purpose. When employing these terminal plates in any furnace employing electric arcs large quantities of steel may be efficiently treated and the majority of the heat may be developed by means of the terminal plates, the arcs being employed merely to insure a satisfactory desulfurization and dephosphorization of the steel.

The three-phase current furnace shown in Fig. 3 is provided with three terminal plates of the kind hereinbefore described. The three electrodes D, D, D, of the three electric arcs, and the three terminal plates, are connected to a three-phase transformer E. The terminal plates are preferably connected and arranged so as to be capable of being used independently of the arc electrodes.

What I claim and desire to secure by Letters Patent of the United States is:—

1. In an electric furnace, a composite terminal plate composed of at least three layers of material of increasing electrical conductivity, and means whereby the outermost best conducting layer is kept comparatively cool.

2. In an electric furnace, a composite terminal plate comprising a metal plate, a facing of highly refractory material, and an intervening layer of material of electrical conductivity intermediate that of the metal plate and that of the refractory material.

3. In an electric furnace, a composite terminal plate comprising a metal plate, a facing of highly refractory material, and an intervening layer of carbonaceous material.

4. In an electric furnace, a composite terminal plate, comprising a metal plate having a large cooling surface, a facing of highly refractory material, and an intervening layer of carbonaceous material.

5. In an electric furnace, a composite terminal plate comprising a metal plate made hollow for the circulation of a cooling medium within it, a facing of highly refractory material, and an intervening layer of carbonaceous material.

6. In an electric furnace, the combination with a composite terminal plate comprising a hollow metal plate, a facing of highly refractory material, and an intervening layer of carbonaceous material, of means for enabling a cooling medium to circulate within the aforesaid hollow plate.

7. In an electric furnace, a composite terminal plate comprising a metal plate, a facing of highly refractory material, and an intervening layer of compressed carbon.

8. In an electric furnace, a composite terminal plate comprising a metal plate made hollow for the circulation of a cooling medium within it, a facing of highly refractory material, and an intervening layer of compressed carbon.

9. In an electric furnace, the combination with a composite terminal plate comprising a metal plate made hollow for the circulation of a cooling medium within it, a facing of highly refractory material, and an intervening layer of compressed carbon, of means for enabling a cooling medium to circulate within the aforesaid hollow plate.

10. In an electric furnace, the combination with the furnace walls, of a composite terminal plate embedded in the aforesaid walls, comprising a rearwardly placed metal plate made hollow for the circulation of a cooling medium within it, a facing of highly refractory material flush with the furnace walls, and an intervening layer of carbonaceous material.

11. In an electric furnace, the combination with the furnace walls, of a plurality of composite terminal plates embedded in the aforesaid walls, each terminal plate comprising a rearwardly placed metal plate made hollow for the circulation of a cooling medium within it, a facing of highly refractory material flush with the furnace walls, and an intervening layer of carbonaceous material.

12. In an electric furnace, the combination with means for producing the electric arc above the charge therein, of a composite terminal plate, situated in the furnace walls, and comprising a metal plate, a facing of highly refractory material, and an intervening layer of carbonaceous material.

13. In an electric furnace, the combination with means for producing the electric arc above the charge therein, of a plurality of composite terminal plates each situated in the furnace walls and comprising a metal plate, a facing of highly refractory material, and an intervening layer of carbonaceous material.

14. In an electric furnace, the combination with means for producing the electric arc above the charge therein, of a composite terminal plate situated in the furnace walls and comprising a metal plate made hollow for the circulation of a cooling medium within it, a facing of highly refractory material, and an intervening layer of carbonaceous material.

15. In an electric furnace, the combination with means for producing the electric arc above the charge therein, of a plurality of composite terminal plates, each situated in the furnace walls and comprising a metal plate made hollow for the circulation of a cooling medium within it, a facing of highly refractory material, and an intervening layer of carbonaceous material.

In testimony whereof I affix my signature in presence of two witnesses.

JOHANNES HÄRDÉN.

Witnesses:
 WALTER J. SKERTEN,
 T. SELBY WARDLE.